INVENTORS
GERARD DE SENARCLENS
HANS MOSIMANN
ERNST DIEHL
WALTER LUTZ

BY *Wenderoth, Lind & Ponack*

ATTORNEYS

United States Patent Office 3,592,711
Patented July 13, 1971

3,592,711
HIGH VOLTAGE FLEXIBLE WINDING INSULATION TAPE
Gerard de Senarclens, Hans Mosimann, and Ernst Diehl, Breitenbach, and Walter Lutz, Laufen, Switzerland, assignors to Schweizerische Isola-Werke
Continuation-in-part of application Ser. No. 351,411, Mar. 12, 1964. This application Sept. 19, 1968, Ser. No. 760,902
Claims priority, application Switzerland, Mar. 14, 1963, 3,216/63
Int. Cl. B32b 19/00
U.S. Cl. 156—250                               8 Claims

ABSTRACT OF THE DISCLOSURE

Flexible winding tapes suitable for insulating machinery rated in excess of 6 kilovolts comprise epoxy resin impregnated mica material on a porous carrier. The epoxy resin contains from 0.2 to 1.4% volatiles and is partially cured to impart to the final tape an adhesive temperature lower than 80° C. and/or a flow test value between 5 and 20%. The dielectric loss factor $tg\delta$ for the insulating tape is essentially constant with increases in voltage to 20 kilovolts and is not more than 10% at 100° C.

CROSS-REFERENCE TO RELATED APPLICATION

This application is a continuation-in-part of application Ser. No. 351,411, filed Mar. 12, 1964, for Flexible Winding Tape, now abandoned.

BACKGROUND OF THE INVENTION

(1) Field of the invention

In accordance with present-day art, a series of processes are employed in the production of generators and large electrical machines, which enable a high voltage insulation to be constructed from mica tapes by means of the conventional continuous method. The mica tapes consist of a carrier, generally glass continuous filament, mica splits or mica paper and a binding agent. Thermoplastic asphalt or shellac were previously used as binding agents which are now progressively being replaced by heat-curing binding agents.

(2) Description of the prior art

According to present-day art, such a tape is wound onto the pre-stiffened and smoothened conductor bundle. In most cases, the bar with the winding thereon is then subjected to an impregnating process.

The technique of cementing the tapes by means of a simple machine-pressing in a so-called coil press, which is usual in the case of low voltage windings, could not previously be performed with any great success in the case of high voltage windings. When the dielectric properties of the tapes satisfied the requirements, such tapes were not sufficiently flexible to be able to be wound tightly without letting in air during winding. The winding had to be treated subsequently in vacuo in order to remove air or confined solvents, and the pores then had to be filled with a solvent-free impregnating agent of low viscosity. The greater the thickness of the winding, the more complicated became the processes. In the case of the process using asphalt, the vacuum treatment and the impregnation have to be repeated over and over again as soon as a few layers of new tape have been wound, because of the high viscosity of the binding agent itself at high temperatures. In newer processes with reactive binding agents (German Pat. 1,000,896) a thin impregnating lacquer must be used. Since, however, with the unsaturated polyester resins used for this purpose, the reaction which converts the resin into a solid body takes place relatively fast even at room temperature, one is forced to cool the impregnating agent.

All these processes thus require voluminous autoclaves in order to be able to impregnate bars of any desired shape and size. In addition to the autoclaves there are the heating and cooling apparatus and, in the case of unsaturated polyesters, the good ventilation means for drawing off styrene vapours which are dangerous for the workers.

According to another process (French Pat. 1,071,178), the bars having an insulation containing certain epoxy resins as binding agent must be pressed in an autoclave with an asphalt compound as hydraulic pressure medium. Processes in which asphalt and bitumen are employed are dirty jobs, the cost of which is generally correspondingly expensive. An autoclave with a heating device is also required in this case.

According to other processes, the coating with solvent-free lacquers or pastes is proposed, which renders machine-winding difficult; because of the excess lacquer which oozes or drips out, this is also a dirty job. Moreover, with this process one is never certain whether the cavities are really filled. Too large an amount of impregnating agent is not desired, since the mica as dielectric should quantitatively form the major portion of the insulation; the carrier and resin are only necessary aids for better working.

A process for direct winding and pressing of the bars in a coil press was mentioned in Swiss Pat. 361,601. It has proven, however, that the bars obtained by this process swell at temperatures exceeding 100° C.

A flexible insulation system for an electrical coil in a sealed apparatus containing a compressible polyhalogenated refrigerant is disclosed and claimed in U.S. Pat. No. 3,254,150, which system is said to obviate the need for an impregnating resin and which consists essentially of a pliable base material, a layer of mica paper disposed upon said base material and a thermosetting binder which is composed of a catalyzed fluid epoxy resin and optionally up to 10% of filler.

However, said insulation system is intended for intermediate voltage machinery, rated 4800 volts and below, and particularly for hermetic refrigeration motors, where inertness to conventional halogenated refrigerants is essential.

SUMMARY OF THE INVENTION

A novel winding tape is very flexible, contains the necessary amount of binding agent, can be wound easily by machine onto a bar and, during winding, lies layer upon layer with such good fit that, after calibration, pressing and hardening of the bar, a faultless high voltage insulation is formed, the loss angle of which is substantially linear within the voltage range up to at least 20 kv. Also the dielectric loss factor $tg\delta$ of an insulation made from the new winding tape increases very slightly, e.g. less than 2% per kilovolt at constant temperature and under optimum operating conditions as shown in the drawings, the insulations obtained with the winding tape of the invention are very good and adhere well on a conductor bundle. The expansion of metallic conductors, e.g. of copper, is accommodated by the insulation within a practical temperature range, e.g. from 0° C. to 160° C. The aging stability of the bars is among the best obtained to date.

It is a primary object of the invention to provide a process for the production of flexible winding tapes suitable for the preparation of high voltage insulations, i.e. insulations for machinery rated in excess of 6 kv.

A further object of the invention resides in the provision of a flexible winding tape suitable for the preparation of high voltage insulations, that obviates the need for an impregnating resin.

A still further object is to provide a flexible winding tape suitable for the preparation of high voltage insulations, which has a specific adhesion temperature or a specific flow test value as hereinafter defined.

Another object resides in the provision of a novel high voltage insulation having improved properties.

This invention relates to flexible winding tape suitable for the preparation of high voltage insulations, its production and use. The tape is produced by (I) dissolving (A) an epoxy resin containing no plasticizer and having an epoxy equivalent of 150 to 400, e.g. from 170 to 200, a viscosity of at least 500 c.p.s., e.g. from 70,000 to 90,000 c.p.s., at 50° C., and a polymerization temperature of at least 120° C., preferably at least 155° C., and (B) at least one hardener for the epoxy resin, the hardener being either (a) an anhydride hardener, e.g. phthalic acid anhydride and eutectic mixtures of anhydrides of partially hydrated phthalic acid, (b) an aromatic amine hardener, e.g. diaminodiphenylmethane and diaminodiphenylsulfone, or (c) a latent hardener, e.g. $BF_3$, a complex of $BF_3$ [a complex thereof with an amine, such as monoethylamine and piperidine, or with ammonia (sold by Anchor Chemical Company, Ltd., Manchester)] and dicyanodiamide, in a suitable solvent such as a ketone, e.g. methyl ethyl ketone, methyl isobutyl ketone and acetone, and mixtures thereof with an aromatic hydrocarbon, e.g. toluene, xylene and products containing such hydrocarbons as main constituents, to form a solution having a viscosity, e.g. 20 to 1000 c.p.s., suitable for the impregnation step, (II) impregnating a mica material and, if desired, a porous carrier, such as a glass fiber web, with the solution, (III) combining the impregnated mica material with said impregnated carrier or with a porous carrier which has not yet been impregnated, (IV) removing the solvent to such an extent that the final tape contains 0.2 to 1.4% by weight of volatile substances (hardener or a component thereof, e.g. the amine component of a $BF_3$ complex) and (V) partially curing the epoxy resin in such a manner that the final tape has an adhesive temperature lower than 80° C. and/or a flow test value between 5 and 20% and contains about 30 to 50% by weight, preferably about 30 to 40% by weight, of the epoxy resin. For high voltage insulations a resin content of less than 30% is inadequate; with as little as 10% by weight filler, e.g. silica, present, even a 35% resin content is inefficient.

The flexible winding tape thus produced for the preparation of high voltage insulations is wrapped about a bundle of assembled conductors immediately prior (and without previous impregnation) to calibrating and hardening the insulation in a heated press or mold for 5 to about 15 hours at a temperature of at least 150° C. and, if desired, aftercuring said insulation in an oven without a mold to obtain better dielectric properties, the total time at 150° C. in the mold and in the oven being at least 15 hours.

FURTHER DETAILS OF THE INVENTION

Figure 1:
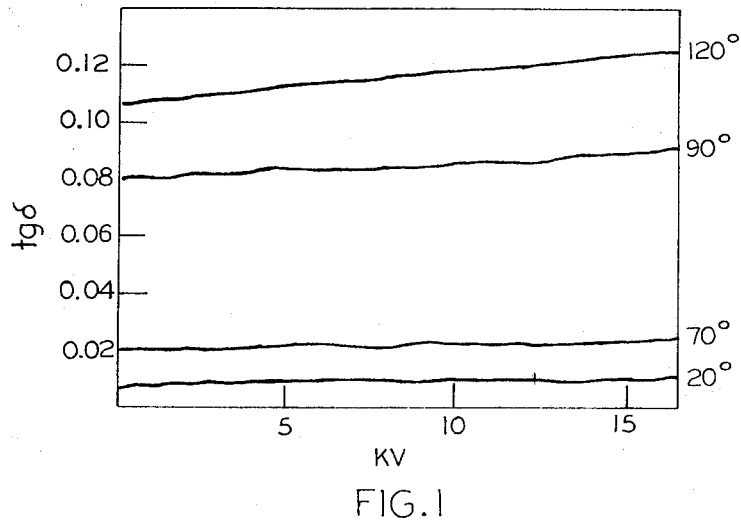
FIGS. 1 and 2 illusrate the relationship of dielectric loss factor to voltage at selected temperatures for windings with tapes produced according to Examples 1 and 2 respectively.

The carrier, e.g. a fabric or unwoven web, is impregnated or saturated with resin or lacquer. It has good heat stability and preferably consists of a fabric of glass continuous filaments having sufficient mechanical strength to withstand the pull during winding and subsequent treatment preceding stiffening of the resin. A fabric consisting of glass continuous filaments and having a weight per unit area of about 40 g./m.² or a thickness of 0.04 mm. is particularly suitable for the purposes of the present invention.

Instead of woven or non-woven fabrics consisting of glass continuous filaments, sufficiently heat-stable woven or non-woven fabrics of synthetic fibers, e.g. polyester fiber fabrics or fabrics of such fibers mixed with glass continuous filaments, can be used.

It is important that the mica material be of absorbent quality. Splittings or flakes of mica can be used for the purposes of the invention; however, it is also possible to employ mica paper. The winding tape of the invention contains from 30 to 60%, preferably 45 to 50% by weight of mica.

From the mere exterior point of view, the binding agent for this tape should fulfill the following conditions:

(1) It should be flexible so that a tape produced therewith lies with close fit on all possible types of windings.

(2) It should not be so fluid and sticky that the tape produced therewith, when rolled, sticks to itself or to a material intermediate the rolled layers. On the other hand, the tape may also not be entirely dry so that, when being wound, it will not detach, when the winding tension is relaxed but remains in adhesion.

(3) A good and as far as possible bubble-free contact should take place between the carrier and the mica.

(4) The binding agent should further be present in the tape still in a hardenable state.

(5) The hardener of the resin, during the time between the production of the winding tape and its use, i.e. a period of at least 6 months, should react, become destroyed or unemployable with regard to other properties only to a minimum degree.

(6) An insulation produced with the tape of the invention should, after the usual hardening for such purposes, have a $tg\delta$ barely dependent upon the temperature within the range of 20° C. to 130° C. which comes in question for a generator or a machine. The $tg\delta$ value should not exceed 10%, for example, at 100° C. and with increasing voltage. The $tg\delta$ should also hardly be dependent upon the voltage up to 20 kv. The increase of the value of $tg\delta$ per kilovolt should not amount to more than 2%.

(7) The hardened insulation produced with the tape of the invention should be able, elastically, to accommodate the expansion of the conductor and the bundle of laminations in operation such that no gaps form even after being in operation for many years.

(8) The hardened insulation produced with the tape of the invention should not soften in heat, plastically deform or flake off and may not detach from the metallic conductor.

(9) Even after being in operation for a long time, no gases product should develop in the interior of the insulation which breaks open the insulation and provides a starting point for the subsequent destruction by means of ionization.

Suitable resins have a viscosity of at least 500 cps. at 50° C. The resins should melt at a temperature of at most 50° C. according to ASTM E 28–58 T. The softening of a resin melting at higher temperatures than 50° C. by addition of external plasticizers is excluded because of the impairment of the $tg\delta$ values at higher temperatures. The epoxy equivalents of suitable resins are approximately in the range of 150 to 400. The epoxy resin is selected according to the requirements made of the tape. Bis-phenol epoxy resins are suitable when the $tg\delta$ values, for example, at temperatures above 100° C. and with increasing voltage may also exceed 10%. In the case of cycloaliphatic epoxy resins in the curve is generally flatter and is in the range of the lower $tg\delta$ values; however, the types available at present require too long to harden in the coil press. Epoxy resins with glycidyl phenylether groups have proven to be particularly suitable for the winding tapes of the invention because these resins, under comparable conditions with anhydride hardeners and latent hardeners, always have higher deformation temperatures according to ASTM D 648–56 than bis-phenol resins and in a relatively short time react with the hardeners to such an extent that they are form-stable. In this case, an insulation can therefore be treated for some hours in the coil press and the complete hardening, as required, can be effected in a furnace. The polymerization temperature of the resin should be above about 150° C. in order to enable reasonable pressing times. A polymerization temperature of about 165° C. is advantageous and can be achieved with most of the usual equipment.

Illustrative epoxy resins are described in an article by H. Batzer and E. Nikles in Chimia, volume 16, page 57 (1962).

Examples of bisphenol epoxy resins include "Araldite F" (viscosity at 50° C.=600 cps.), "Araldite 6005, 6010 and 6020" of Ciba, "Epon 828" (viscosity at 50° C.=800 cps.), "Epon 834" (viscosity at 70° C.=1000 cps.), "Epon 836" (melting point 45° C.) of Shell, "DER 332 and 330" of Dow, "ERL 3794 and 2774" of Union Carbide, "Epi-Rez 510" of Jones-Dabney and "Epotuf 6140" of Reichhold.

Examples of cycloaliphatic epoxy resins include "Epoxyde 201" of Union Carbide, "Unox 207" of Union Carbide and "X 200/8766" of Ciba.

Examples of resins with glycidyl groups include "DEN Epoxy 438" of Dow, "Epophen 1313" of Leicester, Lovell Co. and "Epotuf ED–1005" of Reichhold.

The hardening is effected with acid anhydrides, with aromatic amines, with latent hardeners or combinations thereof. Such hardeners are preferably selected with reference to attaining relatively high softening temperatures of the hardened insulation. Those latent hardeners which are structurally based on Lewis acids, i.e. substances which can accept an electron pair [G. N. Lewis, Valence and Structure of Atoms and Molecules, ACS Monograph Series, New York (1923)], are particularly suitable.

The solvents must be sufficiently volatile that they may be removed in the equipment used for the preparation of the winding tape without appreciable curing of the mixture of resin and hardener.

The manufacture of winding tapes can be effected in the form of a continuous sheet corresponding to the desired width, on conventional machines. The tapes to be used for insulation are then cut from the sheet. The working-up of the tapes is effected according to processes known in electrical engineering. Instead of operating with tapes, one can of course use the material in sheets according to the so-called folium process. In manufacturing the material, conventional separating films, e.g. polyethylene films, may be used to avoid sticking between adjacent layers.

If it is not desired to harden the insulation in a press, e.g. in the case of parts to be insulated which have a complex geometrical shape, it is also possible to use a heat shrinkable film or fabric as outermost layers of the insulation. The melting point of such carriers should be above about 175° C. The best carriers for this purpose are woven terylene tape, polycarbonate cast film and Mylar polyester.

Tests

The dielectric loss factor $tg\delta$ is determined as described in "Dielectric Materials and Applications," by Arthur R. von Hippel, Editor, The Technology Press of M.I.T. and John Wiley & Sons, Inc., New York, pages 51 to 58.

The term "calibrating," as employed herein, means "pressing to bring the part to the size required" of "adjusting the dimensions to the desired value by pressing."

The adhesion temperature can be determined very well by determination of the adhesive point on the "Kofler bank." The "Kofler bank," e.g. manufactured by Messrs. Reichert in Vienna, serves in chemical laboratories for determining melting points. The essential part is a steel band having a temperature gradient of about 50° C. to 250° C. and being provided with an associated temperature scale. If the material to be tested, the binding agent of which adheres or melts within the given temperature range, is pressed between two thin sheets of paper for 10 seconds against a like material with a soft presser, the materials are made to adhere. Upon attempting afterwards to separate the material and the paper again from the cold side, one notes that both materials adhere to each other starting from a certain spot and tear when separated. The temperature corresponding to this spot can advantageously be used to ascertain the most suitable adhesion temperature for application.

The flow test is as follows:

(a) 6 rondelles having a diameter of 63 mm. are cut from the material which is in sheet form, and are weighed.

(b) The rondelles are superposed exactly in register between aluminum foils and placed in the preheated press such that the heating plates cover the rondelles.

(c) The temperature of the press is 120° C. and the pressure 6 kg./cm.$^2$.

(d) The press is at once brought to the prescribed pressure and is kept closed for 5 minutes.

(e) Immediately after the press has been opened the pressed rondelles are removed and cooled in air. Then the aluminum foil is removed, and the edges of the disk formed from the rondelles by the pressing operation are cleaned from resin which has flown out.

(f) The disk is weighed. The difference between the initial weight and the weight of the final disk corresponds to the weight loss resulting from the pressing operation. The weight loss is given in percent of the initial weight.

The contents of volatile substances in the tape is determined by heating a sample weighing about 5 g. for 5 minutes in an oven at 150° C. The weight loss corresponds to the volatile substances.

DESCRIPTION OF PREFERRED EMBODIMENTS

In the examples which follow all parts and percentages are by weight unless otherwise specified.

Example 1

A tape having a thickness of about 0.08 mm. is produced according to known methods from mixed fabric of glass and terylene fibers as carrier combined with a layer of mica splittings. Both materials are saturated with a solution in a 7:3 mixture of methyl ethyl ketone and toluene of 100 parts of Epikote 828, bis-phenol epoxy resin having a viscosity of 800 cps. at 50° C., and 70 to 90 parts of methyl-endo-methylenetetrahydrophthalic acid anhydride (methylnadicanhydride). This solution contains 30 to 60% of solids and has a viscosity of 20 to 1000 cps. After the solvent is evaporated, a material is obtained which can be wound with an intermediate layer of polyethylene. A conductor is insulated with this material. The adhesion temperature is 40° C. The tape lies with good fit, does not loosen when the winding tension is relaxed and can be converted into a solid insulation by means of calibration and pressing which, when properly carried out, has a $tg\delta$ function as shown in FIG. 1.

Example 2

Figure 2:
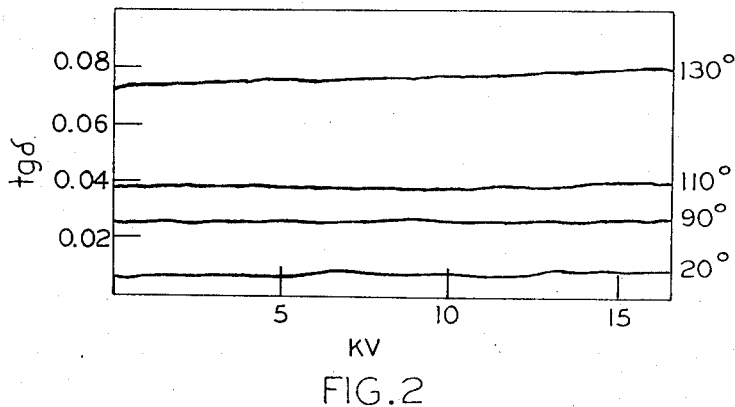

A tape is produced as in Example 1, the binding agent of which consists of Epophen 1315, a resin containing phenyl glycidyl groups and having a viscosity of 75,000 cps. at 50° C. and an epoxy equivalent of 180, and as hardener 0.5 to 5%, preferably 1%, based on the resin, of the complex of BF$_3$ and monoethylamine. These components provide a tape having an adhesion temperature of 50° C. By winding, calibration and pressing, an insulation is obtained, the $tg\delta$ of which corresponds to FIG. 2. This picture does not change even if this insulation is subjected to cycles of heating to 200° C. and cooling to room temperature. This proves that the insulation conforms to the expansion of the metal, when subject to heat treatment.

Example 3

A solution in methyl ethyl ketone of DEN 438 and 1% based on the weight of the resin, of the complex of boron trifluoride and monoethylamine as a catalyst is prepared, which solution has a viscosity of 150 cps. at 20° C. Mica paper weighing, e.g., 120 g./m.² is impregnated with the above solution and is combined with a non-woven fabric from polyester fibers weighing 45 g./m.². The solvent is removed in a continuous bogie furnace and the resin which corresponds to 35% of the total weight of the tape is partially cured until an adhesive temperature of 70° C. or a flow test value of 10 to 15% is reached. The material is slit into tapes and may be used for the preparation of conductor insulations.

It is possible to employ 0.5 to 5% of the catalyst, based upon the resin.

Example 4

A solution of Araldite F and diamino diphenylmethane in the ratio of 100:30 in acetone is prepared, which solution has a viscosity of 170 cps. Mica paper having a thickness of 0.05 mm. and glass fabric (0.07 mm.) are impregnated with said solution and laminated, the solvent is evaporated, and the resin is partially cured so that an adhesion temperature of 75° C. or a flow test value of 10 to 15% is reached. The material is cut into tapes which are stored at about 5° C. in order to improve the shelf life. The tape is used for the preparation of high voltage insulations.

Example 5

A half-coil, such as used in most large turbine-generators, composed of several individually insulated conductors, bonded and consolidated in the straight part (slot section) to a controlled size and shape with the aid of a thermosetting resin, is insulated by multiple layers of the new resin-impregnated mica paper tape. For a final thickness of 3 mm. of the calibrated and cured insulation, 13 layers half overlapped or 26 layers side by side of the tape, 0.17 mm. thick, are used.

Unlike asphalt-bonded mica tapes, which are impregnated after the application of 3 or 4 layers in vacuo, the novel tape is wound, layer after layer as tight as possible, until the calculated number of layers is in place.

The so-taped coil is then wrapped in a sheet of film, acting as a separator-sheet to avoid sticking to the mold, and then placed at room temperature in the press, which is thereupon heated to 165° C. Some pressure, e.g., 0.1 to 1 kg./cm.², is applied to the insulation at the beginning to avoid too much loss of resin.

When the gelification (hardening) of the resin begins, which happens normally after 20 to 30 min., the press is closed with a pressure of about 15 to 25 kg./cm.² on the surface of the insulation.

The curing time is 6 hours, beginning from the moment the press has reached the temperature of 165° C.

After 6 hours the press is cooled down by means of water, and the press is opened after the copper in the press has reached a temperature of about 40° C.

The cured insulation is tough, hard, with a density of at least 1.75 g./cm.³.

Example 6

With reference to Table II, Examples III and IV (column 5) of USP 3,254,150 the noted resin combinations with three different hardeners (with and without 10% by weight finely divided silica fillers) are compared with the product of Example 4 of the subject application. The resin and hardener combinations are as follows:

|  | Proportions[1] | Resins | Hardener |
|---|---|---|---|
| (a) | 20/80 | Epon 828/1001 | Phthalic acid anhydride. |
| (b) | 15/85 | Epon 834/864 | Do. |
| (c) | 15/85 | Epon 834/864+10% SiO₂ | Do. |
| (d) | 20/80 | Epon 828/1001 | Methylnadicanhydride. |
| (e) | 15/85 | Epon 834/864 | Do. |
| (f) | 15/85 | Epon 834/864+10% SiO₂ | Do. |
| (g) | 20/80 | Epon 828/1001 | BF₃.monoethylamine. |
| (h) | 15/85 | Epon 834/864 | Do. |
| (i) | 15/85 | Epon 834/864+10% SiO₂ | Do. |

[1] Parts by weight.

Lacquers are prepared with the several resin combinations and with each of three different types of hardener. The stoichiometric amount of the anhydrides (with respect to the resin) and 3% of the boron complex (based on the resin weight) are employed. Mica paper and a thin glass fabric are impregnated with the lacquers, joined together, dried and then cut into tapes. The resin content is 25% of the total weight. The adhesive point of the Kofler bank is less than 80° C.

These tapes and tape (k) according to Example 4 (35% resin) are separately wrapped about different, but similar, bundles of assembled conductors, calibrated and hardened. The dielectric loss factor ($tg\delta$) is then measured at 20° C. and 130° C. at different voltages.

Tests a, b, c, g, h and i were repeated using 35% resin. The results are tabulated as follows:

| Resin/hardener | Resin (percent by wt.) | Voltage (kv.) | Dielectric loss factor 20° C. | Dielectric loss factor 130° C. |
|---|---|---|---|---|
| (a) | 25 | 1 | 0.012 | 0.5 |
|  |  | 2 | 0.012 | 0.52 |
|  |  | 5 | ---- | 0.5 |
|  |  | 10 | 0.016 | 0.6 |
|  | 35 | 1 | 0.008 | 0.31 |
|  |  | 2 | 0.008 | 0.296 |
|  |  | 5 | 0.01 | 0.295 |
|  |  | 10 | 0.012 | 0.286 |
| (b) | 25 | 1 | 0.008 | 0.203 |
|  |  | 2 | 0.008 | 0.21 |
|  |  | 5 | 0.015 | 0.24 |
|  |  | 10 | 0.026 | 0.308 |
|  | 35 | 1 | 0.007 | 0.38 |
|  |  | 2 | 0.007 | 0.37 |
|  |  | 5 | 0.008 | 0.39 |
|  |  | 10 | 0.01 | 0.39 |
| (c) | 25 | 1 | 0.007 | 0.16 |
|  |  | 2 | 0.007 | 0.161 |
|  |  | 5 | 0.01 | 0.17 |
|  |  | 10 | 0.014 | ¹ 0.216 |
|  | 35 | 1 | 0.01 | 0.13 |
|  |  | 2 | 0.008 | 0.13 |
|  |  | 5 | 0.008 | 0.14 |
|  |  | 10 | 0.01 | 0.17 |
| (d) | 25 | 1 | 0.007 | 0.18 |
|  |  | 2 | 0.008 | 0.158 |
|  |  | 5 | 0.009 | 0.14 |
|  |  | 10 | 0.012 | 0.17 |
| (e) | 25 | 1 | 0.005 | 0.126 |
|  |  | 2 | 0.008 | 0.123 |
|  |  | 5 | 0.009 | 0.18 |
|  |  | 10 | 0.01 | 0.299 |
| (f) | 25 | 1 | 0.012 | 0.17 |
|  |  | 2 | 0.012 | 0.147 |
|  |  | 5 | 0.012 | 0.14 |
|  |  | 10 | 0.015 | 0.155 |
| (g) | 25 | 1 | 0.01 | 0.156 |
|  |  | 2 | 0.01 | 0.162 |
|  |  | 5 | 0.01 | 0.154 |
|  |  | 10 | 0.012 | (¹) |
|  | 35 | 1 | 0.006 | 0.283 |
|  |  | 2 | 0.008 | 0.26 |
|  |  | 5 | 0.008 | 0.25 |
|  |  | 10 | 0.01 | 0.228 |
| (h) | 25 | 1 | 0.01 | 0.16 |
|  |  | 2 | 0.011 | 0.16 |
|  |  | 5 | 0.012 | 0.152 |
|  |  | 10 | 0.014 | (¹) |
|  | 35 | 1 | 0.008 | 0.153 |
|  |  | 2 | 0.01 | 0.152 |
|  |  | 5 | 0.012 | 0.145 |
|  |  | 10 | 0.012 | 0.155 |
| (i) | 25 | 1 | 0.011 | 0.17 |
|  |  | 2 | 0.012 | 0.17 |
|  |  | 5 | 0.012 | 0.154 |
|  |  | 10 | 0.013 | 0.163 |
|  | 35 | 1 | 0.008 | 0.21 |
|  |  | 2 | ---- | 0.202 |
|  |  | 5 | ---- | 0.20 |
|  |  | 10 | 0.012 | 0.19 |
| (k) | 35 | 1 | 0.01 | 0.046 |
|  |  | 2 | ---- | 0.046 |
|  |  | 5 | ---- |  |
|  |  | 10 | 0.014 | 0.056 |

¹ Bubble formation.

The results of tests (a) to (i) show that the thus-prepared tapes are not suitable in the high tension field. The dielectric loss factor values at 130° C. are too high even when 35% by weight of resin is employed.

What is claimed is:

1. A process for the production of a flexible winding tape suitable for the preparation of high voltage insulations which comprises dissolving an epoxy resin containing no plasticizer and having an epoxy equivalent of 150 to 400 and a viscosity of at least 500 cps. at 50° C. and at least one hardener selected from the group consisting of an anhydride hardener, an aromatic amine hardener and a latent hardener acting as a hardener for the epoxy resin, in a solvent suitable to form a solution having a viscosity suitable for the impregnation step, impregnating at least one material selected from the group consisting of mica material and a porous carrier with said solution, laminating the mica material with the carrier, removing the solvent to such an extent that the final tape contains 0.2 to 1.4% volatile substances, partially curing the epoxy resin in such a manner that the final tape has an adhesive temperature lower than 80° C. and/or a flow test value between 5 and 20% and contains about 30 to 50% by weight of the epoxy resin, and cutting the thus obtained laminate into tapes.

2. A process according to claim 1 wherein the final tape contains about 30 to 40% by weight of the epoxy resin.

3. A process according to claim 1 wherein the epoxy resin has an epoxy equivalent of 170 to 200 and a viscosity at 50° C. of 70,000 to 90,000 cps. and contains glycidyl phenyl ether groups in the molecule.

4. A process according to claim 1 wherein the latent hardener is an adduct of boron trifluoride.

5. A process for the production of a flexible winding tape suitable for the preparation of high voltage insulations which comprises dissolving an epoxy resin containing no plasticizer and having an epoxy equivalent of 150 to 400 and a viscosity of at least 500 cps. at 50° C., and at least one hardener selected from the group consisting of an anhydride hardener, an aromatic amine hardener and a latent hardener acting as a hardener for the epoxy resin, in a solvent suitable to form a solution having a viscosity suitable for the impregnation step, impregnating a mica material with said solution, laminating the mica material with a porous carrier, impregnating the carrier with said solution, removing the solvent to such an extent that the final tape contains 0.2 to 1.4% volatile substances, partially curing the epoxy resin in such a manner that the final tape has an adhesive temperature lower than 80° C. or a flow test value between 5 and 20%, or has an adhesive temperature lower than 80° C. and a flow test value between 5 and 20% and contains about 30 to 50% by weight of the epoxy resin, and cutting the thus obtained laminate into tapes.

6. A process according to claim 5 wherein the final tape contains about 30 to 40% by weight of the epoxy resin.

7. A process according to claim 5 wherein the epoxy resin has an epoxy equivalent of 170 to 200 and a viscosity at 50° C. of 70,000 to 90,00 cps. and contains glycidyl phenyl ether groups in the molecule.

8. A process according to claim 5 wherein the latent hardener is an adduct of boron trifluoride.

References Cited

UNITED STATES PATENTS 3,418,197  12/1968  Hampshire _____ 156—330X
3,458,389  7/1969   Mertens _____ 156—330X BENJAMIN R. PADGETT, Primary Examiner S. J. LECHERT, JR., Assistant Examiner U.S. Cl. X.R.

156—269, 297, 330; 161—88, 163, 170